US012330004B2

(12) United States Patent
Wancho

(10) Patent No.: US 12,330,004 B2
(45) Date of Patent: Jun. 17, 2025

(54) FIRE SUPPRESSION SPRINKLER AND DEFLECTOR

(71) Applicant: Victaulic Company, Easton, PA (US)

(72) Inventor: Thomas F. Wancho, Bethlehem, PA (US)

(73) Assignee: Victaulic Company, Easton, PA (US)

(*) Notice: Subject to any disclaimer, the term of this patent is extended or adjusted under 35 U.S.C. 154(b) by 667 days.

(21) Appl. No.: 17/313,120

(22) Filed: May 6, 2021

(65) Prior Publication Data

US 2021/0252322 A1 Aug. 19, 2021

Related U.S. Application Data

(62) Division of application No. 15/690,438, filed on Aug. 30, 2017, now Pat. No. 11,400,330.

(60) Provisional application No. 62/385,273, filed on Sep. 9, 2016.

(51) Int. Cl.

| | |
|---|---|
| ***A62C 37/14*** | (2006.01) |
| ***A62C 3/00*** | (2006.01) |
| ***A62C 31/02*** | (2006.01) |
| *B05B 1/26* | (2006.01) |

(52) U.S. Cl.
CPC .............. *A62C 37/14* (2013.01); *A62C 3/002* (2013.01); *A62C 31/02* (2013.01); *B05B 1/265* (2013.01)

(58) Field of Classification Search
CPC ................................................ A62C 37/11–16
USPC ................................................ 169/37–41, 90
See application file for complete search history.

(56) References Cited

U.S. PATENT DOCUMENTS

| | | | |
|---|---|---|---|
| 2,135,138 | A | 11/1938 | Kendall |
| 2,949,241 | A | 8/1960 | Simon |
| 4,099,675 | A | 7/1978 | Wohler et al. |
| 5,366,022 | A | 11/1994 | Meyer et al. |
| 5,579,846 | A | 12/1996 | Meyer et al. |
| 5,584,344 | A | 12/1996 | Meyer et al. |
| 5,609,211 | A | 3/1997 | Meyer et al. |
| 5,628,367 | A | 5/1997 | Truax et al. |

(Continued)

FOREIGN PATENT DOCUMENTS

| | | |
|---|---|---|
| CA | 2283155 | 9/1998 |
| CA | 2348144 | 11/2001 |

(Continued)

OTHER PUBLICATIONS

Author Unknown; Reliable—ESFR Pendent Sprinklers; www.reliablesprinkler.com; Bulletin 019 Jun. 2020; 5 pages.

(Continued)

*Primary Examiner* — Cody J Lieuwen
(74) *Attorney, Agent, or Firm* — Ballard Spahr LLP

(57) ABSTRACT

A fire suppression sprinkler has a deflector with two slots aligned with the deflector support arms. The two slots extend from opposite sides of a periphery of the deflector along a common line which passes though the sprinkler's flow axis. The two slots extend to a point which underlies the sprinkler's nose at the ends of the support arms to which the deflector is attached. Other slots extend from the periphery of the deflector along lines which do not pass through the sprinkler flow axis. The other slots extend to points in spaced relation to the nose. Regions of the deflector periphery surrounding the first and second slots are closer to the flow axis than other regions of the periphery.

20 Claims, 4 Drawing Sheets

(56) References Cited

U.S. PATENT DOCUMENTS

| | | | | | |
|---|---|---|---|---|---|
| 5,664,630 | A | | 9/1997 | Meyer et al. | |
| 5,687,914 | A | | 11/1997 | Bosio et al. | |
| 5,829,532 | A | | 11/1998 | Meyer et al. | |
| 5,839,667 | A | | 11/1998 | Fischer | |
| 5,865,256 | A | | 2/1999 | Pounder | |
| 5,890,657 | A | | 4/1999 | Ponte | |
| 6,026,907 | A | * | 2/2000 | Pahila .................... | A62C 31/02 239/524 |
| 6,059,044 | A | | 5/2000 | Fischer | |
| 6,098,718 | A | | 8/2000 | Sato | |
| 6,276,460 | B1 | | 8/2001 | Pahila | |
| 6,308,784 | B1 | | 10/2001 | Mears | |
| 6,446,732 | B1 | | 9/2002 | Polan | |
| 6,450,265 | B1 | | 9/2002 | Ponte | |
| 6,450,266 | B1 | | 9/2002 | Pahila | |
| 6,502,643 | B1 | | 1/2003 | Meyer et al. | |
| 6,516,893 | B2 | | 2/2003 | Pahila | |
| 6,868,917 | B2 | | 3/2005 | Meyer et al. | |
| 6,976,543 | B1 | | 12/2005 | Fischer | |
| 7,165,624 | B1 | | 1/2007 | Fischer | |
| 7,201,234 | B2 | | 4/2007 | Rogers et al. | |
| 7,314,093 | B2 | | 1/2008 | Orr | |
| 7,343,980 | B2 | | 3/2008 | Pahila | |
| 7,624,812 | B2 | | 12/2009 | Pahila | |
| 7,658,231 | B2 | | 2/2010 | Rogers et al. | |
| 7,730,959 | B2 | | 6/2010 | Fischer | |
| 7,735,570 | B2 | | 6/2010 | Fischer | |
| 7,766,091 | B2 | | 8/2010 | Fischer | |
| 8,074,725 | B2 | | 12/2011 | Rogers et al. | |
| 8,087,467 | B2 | | 1/2012 | Franson et al. | |
| 8,172,001 | B2 | | 5/2012 | Tow et al. | |
| 8,176,988 | B2 | | 5/2012 | Fischer | |
| 8,186,448 | B2 | | 5/2012 | Fischer | |
| 8,353,356 | B2 | | 1/2013 | Rogers | |
| 8,353,357 | B2 | | 1/2013 | Thompson | |
| 8,376,061 | B2 | | 2/2013 | Feenstra | |
| 8,485,270 | B2 | | 7/2013 | Fischer | |
| 8,646,539 | B2 | | 2/2014 | Abels et al. | |
| 8,905,151 | B2 | * | 12/2014 | Silva, Jr. ................ | A62C 37/12 169/41 |
| 8,940,082 | B2 | | 1/2015 | Eich et al. | |
| 9,089,729 | B2 | | 7/2015 | Almeida et al. | |
| 9,132,205 | B2 | | 9/2015 | Feenstra | |
| 9,457,213 | B2 | | 10/2016 | Miller et al. | |
| 9,717,937 | B2 | | 8/2017 | Miller et al. | |
| 9,827,455 | B1 | * | 11/2017 | Tapia Negrete ....... | A62C 37/14 |
| 2007/0169945 | A1 | | 7/2007 | Rogers et al. | |
| 2007/0246232 | A1 | | 10/2007 | Pahila | |
| 2007/0256843 | A1 | | 11/2007 | Pahila | |
| 2008/0073088 | A1 | | 3/2008 | Ide et al. | |
| 2009/0126950 | A1 | | 5/2009 | Rogers | |
| 2010/0212919 | A1 | | 8/2010 | Fischer | |
| 2010/0236795 | A1 | | 9/2010 | Feenstra | |
| 2011/0036598 | A1 | * | 2/2011 | Pahila .................... | A62C 3/002 169/37 |
| 2012/0234562 | A1 | * | 9/2012 | Fischer .................. | A62C 31/02 169/37 |
| 2012/0216498 | A1 | | 10/2012 | Kameishi et al. | |
| 2014/0174765 | A1 | | 6/2014 | Miller et al. | |
| 2015/0122513 | A1 | | 5/2015 | Miller et al. | |
| 2015/0246253 | A1 | | 9/2015 | Miller et al. | |
| 2017/0151456 | A1 | | 6/2017 | Abels et al. | |
| 2018/0071562 | A1 | | 3/2018 | Wancho | |
| 2020/0282246 | A1 | | 9/2020 | Sato et al. | |
| 2021/0094051 | A1 | | 4/2021 | Koiwa | |

FOREIGN PATENT DOCUMENTS

| | | | |
|---|---|---|---|
| CA | 2385352 | | 1/2002 |
| CA | 2384904 | | 12/2002 |
| CA | 2458421 | | 8/2005 |
| CA | 2827495 | | 6/2006 |
| CA | 2663777 | | 11/2007 |
| CA | 2695917 | | 2/2009 |
| CA | 2759321 | | 11/2010 |
| CA | 2885532 | | 3/2014 |
| EP | 1264616 | | 12/2002 |
| EP | 3023127 | | 5/2016 |
| GB | 1351508 | | 5/1974 |
| JP | 2001046544 | | 2/2001 |
| KR | 2015070155 | | 6/2015 |
| RU | 2534978 | | 12/2014 |
| WO | 9306891 | | 4/1993 |
| WO | 9732670 | | 9/1997 |
| WO | 9839065 | | 9/1998 |
| WO | 0207824 | | 1/2002 |
| WO | 2006133057 | | 12/2006 |
| WO | 2007124403 | | 11/2007 |
| WO | 2008054863 | | 5/2008 |
| WO | 2009021067 | | 12/2009 |
| WO | 2010107451 | | 9/2010 |
| WO | 2010162547 | | 11/2010 |
| WO | 2013106244 | A2 | 7/2013 |
| WO | 2013159063 | | 10/2013 |
| WO | 2014047499 | | 3/2014 |

OTHER PUBLICATIONS

Author Unknown; Tyco—Model K-17-231—Upright and Pendent Sprinklers; www.tyco-fire.com; TFP332—Aug. 2018; 4 pages.

Author Unknown; Tyco—Model ESFR-25—25.2 K-factor Pendent Sprinkler, www.tyco-fire.com; TFP312—Mar. 2020; 6 pages.

Author Unknown; Victaulic—Firelock V47, K16.8; Model 4702 Early Suppression Fast Response; www.victaulic.com; 40.89—Victaulic Company 2019; 5 pages.

Author Unknown; Victaulic—LP-46 Low Pressure Storage Sprinkler; Model V4601, K25, Storage Pendent Sprinkler; www.victaulic.com; 40.95—Victaulic Company 2018; 9 pages.

* cited by examiner

FIRE SUPPRESSION SPRINKLER AND DEFLECTOR

CROSS REFERENCE TO RELATED APPLICATION

This application is a divisional of U.S. patent application Ser. No. 15/690,438, filed Aug. 30, 2017, which application is based upon and claims priority to U.S. Provisional Application No. 62/385,273, filed Sep. 9, 2016, both applications being hereby incorporated by reference.

FIELD OF THE INVENTION

This invention relates to fire suppression sprinklers and deflectors used with fire suppression sprinklers.

BACKGROUND

Early suppression fast response (ESFR) fire suppression sprinklers face challenges when used to protect commodities in warehouses having a large clearance between the warehouse ceiling and the commodity. Warehouses having a ceiling height of 40 feet and greater may have commodities shelved at a height of 20 feet and less from the floor, leaving a clearance of twenty feet or greater between the ceiling (near where the sprinklers are positioned) and the commodity. The challenges to ESFR sprinklers operating at such clearances include maintaining a core flow of fire suppressing liquid which has sufficient density and velocity to suppress a fire below the sprinkler itself while also maintaining an outer surrounding "umbrella" spray pattern to provide the required disbursement protecting the desired area, as well as sufficient flow in an intermediate range between the outer umbrella pattern and the core flow to prevent a fire in that intermediate zone from growing and overwhelming the outer umbrella. However, for some prior art ESFR sprinkler designs the large clearance distance between the sprinkler and the commodity allows the spray pattern to become disbursed over too large an area, thereby reducing the spray pattern density, especially in the intermediate zone, and hence the sprinkler's fire suppression effectiveness. Such conditions may also allow updrafts created by a fire plume in the intermediate zone to disrupt and lift the outer umbrella spray pattern, which in some cases causes wetting and cooling of adjacent sprinklers, thereby preventing or delaying their operation. This phenomenon is known as "skipping" because the fire's heat plume "skips" the nearby cooled sprinklers which are otherwise best placed to suppress the fire. Furthermore, skipping also tends to trigger sprinklers that are more remote from the fire, and thus less effective at fire suppression. The result is an increase in both fire and water damage as well as additional risk to firefighters called to fight the blaze.

There is clearly an opportunity to improve fire suppression sprinklers, particularly ESFR type sprinklers, to handle the challenges of high clearance warehouse fire protection.

SUMMARY

The invention concerns a fire suppression sprinkler. In an example embodiment the sprinkler comprises a body surrounding a bore. The bore defines a flow axis arranged coaxially with the bore. First and second arms are mounted on opposite sides of the body and extend therefrom in a direction along the flow axis. A nose is mounted on an end of the arms. The nose is positioned coaxially with the flow axis. A deflector is mounted on the nose. IN an example embodiment, the deflector comprises a plate oriented transversely to the flow axis. The plate comprises a plurality of slots defining a plurality of tines. A first and a second of the slots are radially oriented with respect to the flow axis and respectively aligned with the first and second arms. The first and second slots extend from a periphery of the plate to respective points underlying the nose. A remainder of the slots extends from the periphery to respective points in spaced relation from the nose.

In an example embodiment, the tines are positioned on opposite sides of the first and second slots and have ends at a first distance from the flow axis. The tines positioned on opposite sides of the remainder of the slots have ends at a second distance greater than the first distance.

By way of example, the first and second slots define respective first and second areas. The first and the second areas each are greater than any area defined by any slot of the remainder of the slots. Also by way of example, the remainder of the slots further comprises a first pair of slots flanking the first slot and a second pair of slots flanking the second slot.

In an example embodiment, the slots comprising the first and second pairs extend along respective lines which do not intersect the flow axis.

Further by way of example, each of the slots comprising the first and second pairs are asymmetrical with respect to the respective lines. In an example embodiment, the remainder of the slots further comprises a third pair of slots flanking the first slot and a fourth pair of slots flanking the second slot. The first pair of slots is between the first slot and the third pair of slots, the second pair of slots is between the second slot and the fourth pair of slots.

By way of example, each of the slots comprising the first, second, third and fourth pairs extends along respective lines which do not intersect the flow axis. In another example, each of the slots comprising the first, second, third and fourth pairs is asymmetrical with respect to the respective lines.

In an example embodiment, the slots of the first pair extend from the periphery to first the respective points in spaced relation to the nose, and slots of the second pair extend from the periphery to second the respective points in spaced relation to the nose. The second points are further from the nose than the first points. Also by way of example, the remainder of the slots further comprises respective intermediate slots. Each intermediate slot is between two slots of the plurality of slots.

In an example embodiment, the intermediate slots extend from the periphery to third the respective points in spaced relation to the nose. The third respective points are further from the nose than the second points.

By way of example, each of the first and second slots has a first width proximate to the periphery and a second width distal to the periphery. The second width is greater than the first width. Further by way of example, the first and second arms have a first thickness proximate to the nose and a second thickness proximate to the body. The first width of the first and second slots is greater than the first thickness of the arms. The second width of the first and second slots is greater than the second thickness of the arms in an example embodiment.

An example embodiment of the sprinkler according to the invention further comprises a sealing member removably engaged with the body overlying the bore. A heat sensitive trigger extends between the nose and the sealing member for releasing the sealing member from engagement with the body when a predetermined ambient temperature is achieved. In an example embodiment the sealing member comprises a plug and the heat sensitive trigger comprises a frangible glass bulb containing a heat sensitive liquid.

In an example embodiment, the sprinkler may have a k factor from 14 to 34. In a particular example, the sprinkler may have a k factor of 16.8. Further by way of example, the deflector has a thickness. In one example embodiment, the deflector is mounted in spaced relation to the ends of the arms at a distance equal to twice the thickness of the deflector. In another example embodiment, the deflector is mounted in spaced relation to the ends of the arms at a distance equal to three times the thickness of the deflector.

The invention also encompasses a deflector for a fire suppression sprinkler. In an example embodiment the deflector comprises a circular plate having a periphery surrounding a center. First and second slots in the plate extend from diametrically opposed points on the periphery along a common diameter toward the center. A first plurality of slots are positioned around the plate between the first and second slots. Each of the slots of the first plurality extends from the periphery along a respective chord of the circular plate. A second plurality of slots are positioned around the plate. Each slot of the second plurality of slots is positioned between the first and second slots and extends from the periphery along a respective radius of the circular plate toward the center.

Further by way of example, the first and second slots have respective ends at a first distance from the center. A first half of the first plurality of slots have respective ends at a second distance from the center. A second half of the first plurality of slots have respective ends at a third distance from the center. The second plurality of slots have respective ends at a fourth distance from the center. In an example embodiment, the first distance is less than the second distance, the second distance is less than the third distance, and the third distance is less than the fourth distance.

In a further example embodiment, the first and second slots define respective first and second areas. The first and the second areas each are greater than any area defined by any slot of the first and second plurality of slots in an example embodiment. By way of example, first and second regions of the periphery respectively flanking the first and second slots each have a radius less than a radius of a remainder of the periphery.

By way of example, each one of the slots of the first plurality of slots is asymmetrical with respect to the respective chord of the circular plate along which each one of the slots of the first plurality extends. Further by way of example, each one of the slots of the second plurality of slots is symmetrical with respect to the respective radius of the circular plate along which each one of the slots of the second plurality extends.

In an example embodiment, each one of the first and second slots has a first width over a first region proximate to the periphery and a second width over a second region positioned between the first region and the center. The first width is less than the second width in an example embodiment.

DETAILED DESCRIPTION

Figure 1:
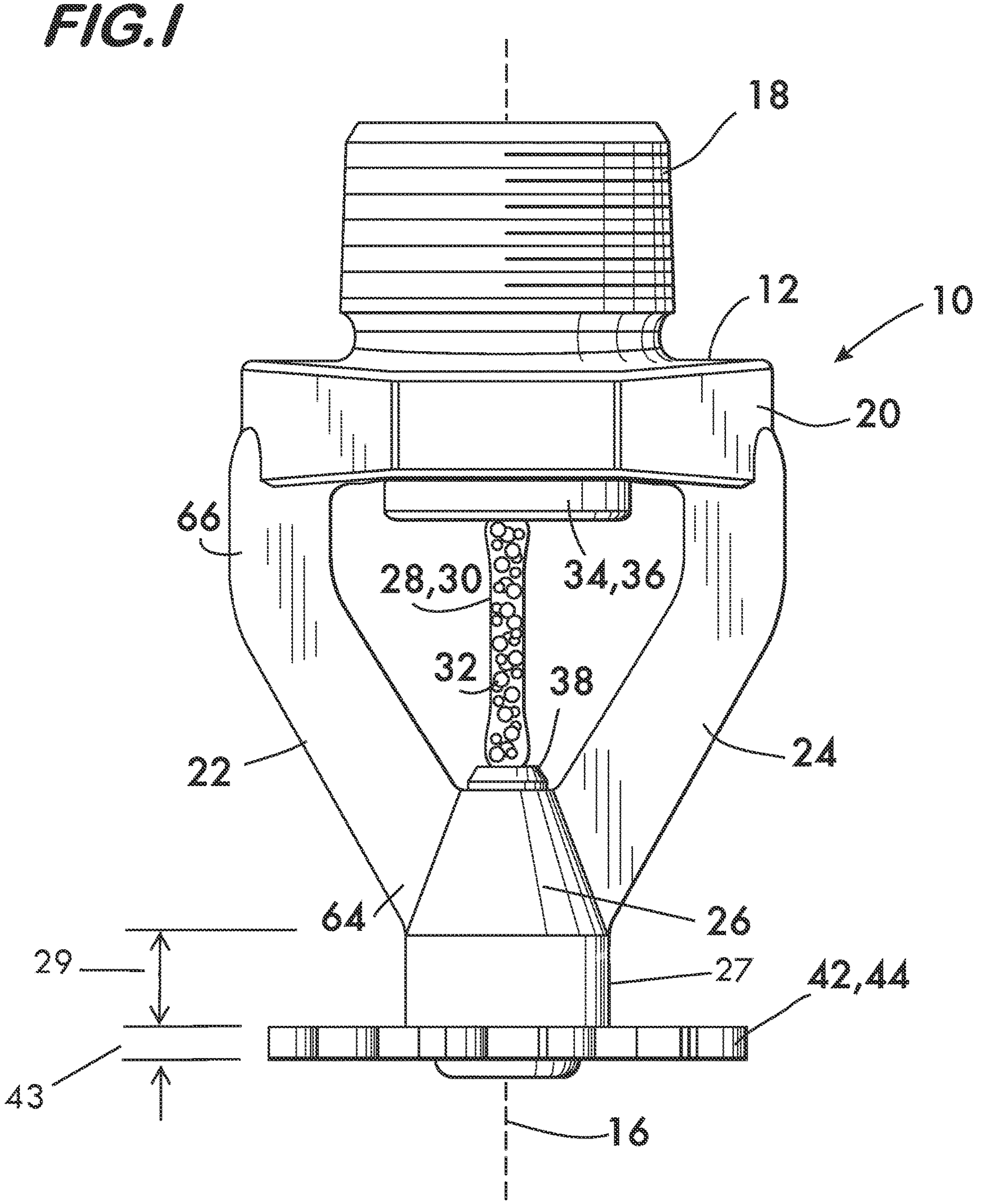
FIG. 1 is a side view of an example fire suppression sprinkler according to the invention.
Figure 2:
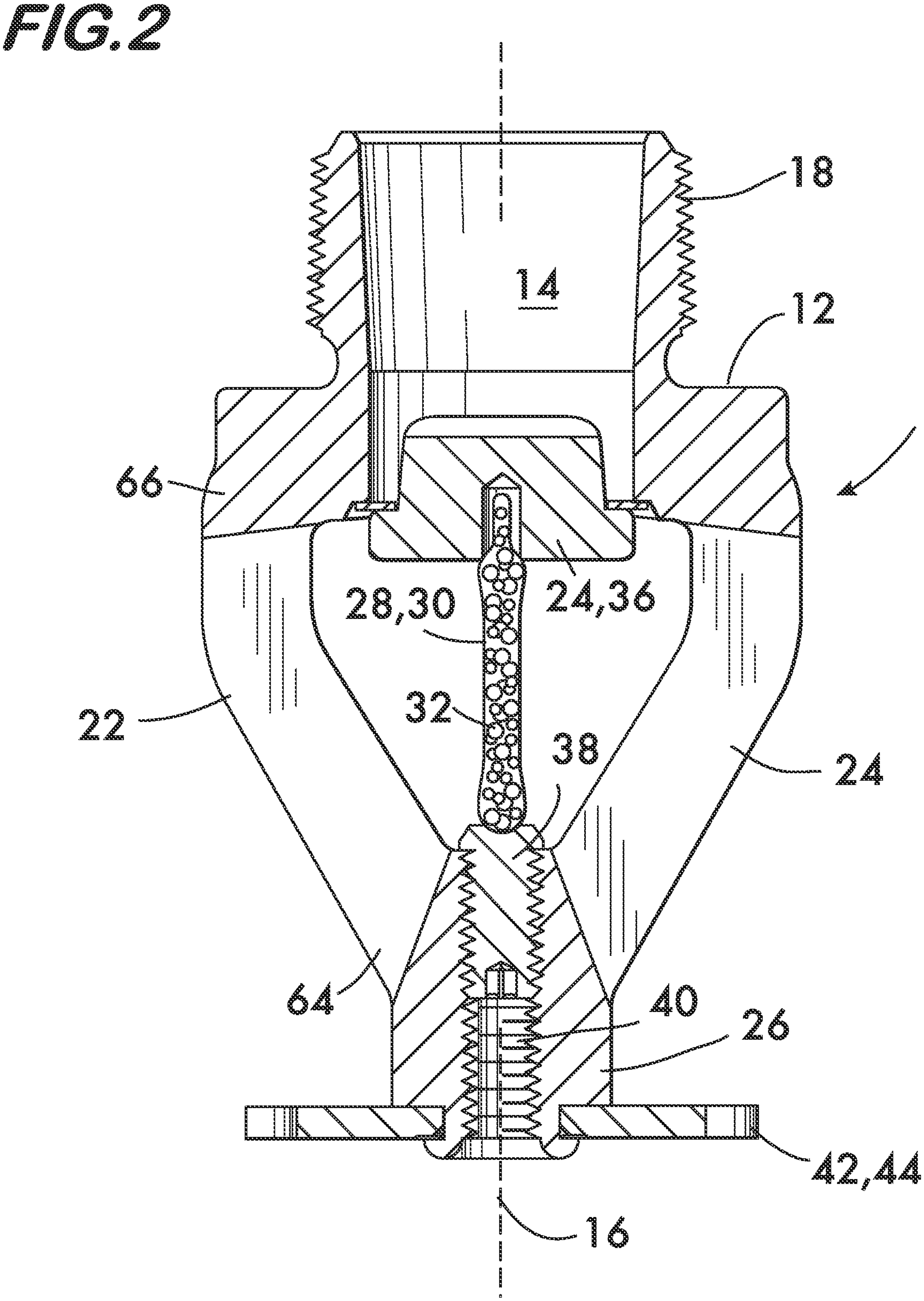
FIG. 2 is a cross sectional view of the fire suppression sprinkler shown in FIG. 1.

FIGS. 1 and 2 show an example fire suppression sprinkler 10 according to the invention. Sprinkler 10 may be, for example, an early suppression fast response (ESFR) sprinkler having a "k factor" from about 14 to about 34, and specifically 16.8. The k factor relates the water discharge rate "Q" from the sprinkler to the water pressure "p" within the sprinkler by the formula $Q=k(p)^{1/2}$.

Sprinkler 10 comprises a body 12 which surrounds a bore 14. Bore 14 defines a flow axis 16 arranged coaxially with the bore. Body 10 may have a threaded nipple 18 for connection of the sprinkler 10 to a piping network of a fire suppression system (not shown) and a plurality of flat surfaces 20 which receive a wrench for applying torque to the sprinkler during installation. First and second arms 22 and 24 extend along flow axis 16 from opposite sides of body 12 and support a nose 26 mounted on the ends of the arms. Nose 26 is positioned coaxially with the flow axis 16 and supports a heat sensitive trigger 28. Nose 26 has a portion 27, advantageously cylindrical, which extends beyond the ends of arms 22 and 24 a distance 29, thereby permitting a deflector to be mounted on nose 26 in spaced relation to the ends of arms 22 and 24.

In this example the heat sensitive trigger 28 comprises a frangible glass bulb 30 containing a heat sensitive liquid 32. Bulb 30 extends between nose 26 and a sealing member 34, in this example a plug 36 which overlies and seals the bore 14 through engagement with body 12. Nose 26 also comprises a set screw 38, threaded within a bore 40 in nose 26 aligned with the bulb 30. The set screw 38 permits assembly of the bulb 30 into the sprinkler 10 and adjustment of the compression force on the bulb. Bulb 30 supports the plug 36 to maintain the sprinkler 10 in its closed configuration (shown). Bulb 30 breaks when the ambient temperature reaches a predetermined value, for example, indicative of a fire. When the bulb breaks it no longer support plug 36 which is released from engagement with the body 12 to open sprinkler 10 and allow water or other fire suppressing fluid to be discharged. Other heat sensitive triggers are also feasible, such as those having components held together by a solder which melts at a predetermined temperature to allow the sprinkler to open.

Figure 3:
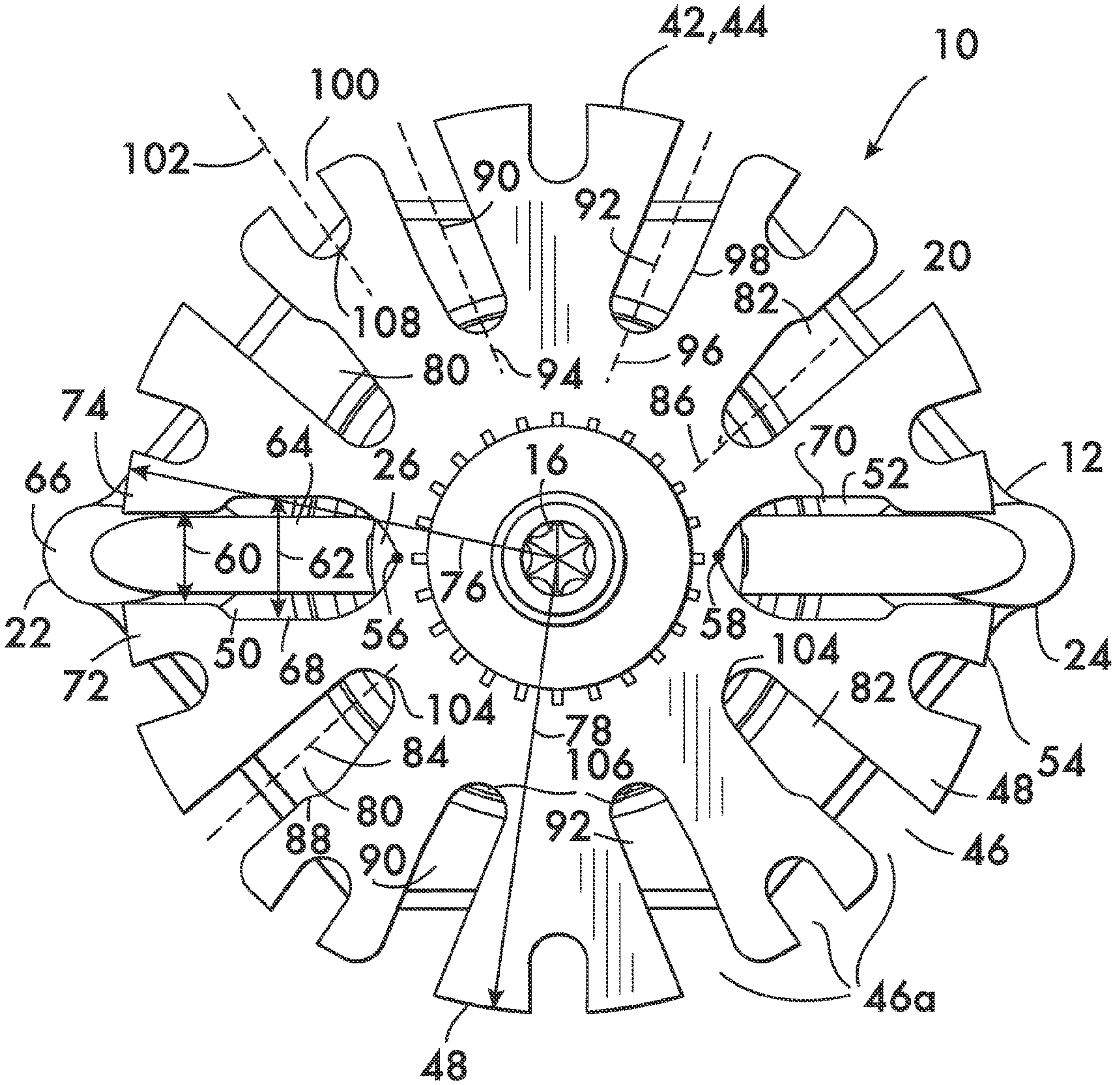
FIG. 3 is an end view of the fire suppression sprinkler shown in FIG. 1.

A deflector 42 is mounted on the nose 26. As shown in FIGS. 2 and 3, the example deflector 42 comprises a substantially circular plate 44 oriented transversely to the flow axis 16, and having a thickness 43. The deflector 42 is positioned in spaced relation to the ends of arms 22 and 24 at the distance 29. In an example embodiment, the distance 29 is greater than twice the thickness 43 of deflector 42. In a preferred embodiment, the distance 29 is approximately three times the thickness 43 of deflector 42.

A plurality of slots 46 in plate 44 define a plurality of tines 48. Slots 46 and tines 48 are designed in conjunction with nose 26, arms 22 and 24 and bore 14 to meet standards governing discharge rate, coverage area size and shape, and other performance standards in order to be permitted to be installed under the codes and standards established by authorities such as the National Fire Protection Association (NFPA), including NFPA 13 "Standard for the Installation of Sprinkler Systems". The required testing that compliant sprinklers must pass is set forth in standards promulgated by nationally recognized testing laboratories such as FM Global and UL, such standards including UL 1767 and FM 2008. These standards set forth various tests that compliant sprinklers must pass, including water flow and distribution tests, Actual Delivered Density (ADD) tests, and live fire tests, with UL 1767 including a fire test specifically focused on the high clearance applications.

The example sprinkler 10 is designed to meet the UL 1767 criteria for an ESFR sprinkler that may be used in warehouses with ceilings 40 feet high and greater and wherein the stored commodity to be protected is shelved 20 feet from the floor of the warehouse and lower, yielding 20 feet of clearance or greater between the ceiling and commodity. To this end, deflector 42 comprises first and second slots 50 and 52 in plate 44. Slots 50 and 52 are radially oriented with respect to the flow axis 16 and, as apparent from FIG. 3, are aligned, respectively, with the first and second arms 22 and 24. Slots 50 and 52 extend from the periphery 54 of the plate 44 to respective points 56 and 58 which underlie the nose 26. The remainder 46*a* of the plurality of slots 46 extend from periphery 54 to respective points in spaced relation away from nose 26 as described in detail below.

In the example deflector 42 slots 50 and 52 have first width 60 proximate to periphery 54 and a second width 62 distal to the periphery. The second width 62 is greater than the first width 60. As further shown in FIGS. 1 and 3, the arms 22 and 24 have a first thickness 64 proximate to nose 26 and a second thickness 66 proximate to the body 12. As shown in FIG. 3 for sprinkler 10, the first widths 60 of first and second slots 50 and 52 is greater than the first thicknesses 64 of arms 22 and 24, and the second widths 62 of the slots 50 and 52 is greater than the second thicknesses 66 of arms 22 and 24. Additionally, the first and second slots 50 and 52 define respective first and second areas 68 and 70. Each area 68 and 70 is greater than any area defined by any slot of the remainder of slots 46*a*.

As further shown in FIG. 3, tines 72 and 74 which are positioned on opposite sides of the first and second slots 50 and 52 each have ends at a first distance 76 measured from the flow axis 16. Tines 48 positioned on opposite sides of the remainder of slots 46*a* each have ends at a second distance 78 that is greater than the first distance 76. In a practical example of a deflector 42 the first distance 76 ranges from about 0.729 inches to about 0.779 inches, with a first distance of about 0.754 expected to be advantageous. The second distance 78 ranges from about 0.754 inches to about 0.804 inches, with a second distance of about 0.779 inches expected to be advantageous when the first distance is about 0.754 inches as noted above.

The remainder of slots 46*a* (i.e., slots other than first and second slots 50 and 52) are organized as pairs of slots. A first pair of slots 80 flank (i.e. are positioned on opposite sides) of the first slot 50 and a second pair of slots 82 flank the second slot 52. Slots 80 and 82 extend along respective lines 84 and 86 which do not pass through the flow axis 16. The slots 80 and 82 are furthermore asymmetric with respect to respective lines 84 and 86 as evidenced by the curved perimeter region 88 present only on one side of slots 80 and 82. A third pair of slots 90 also flank the first slot 50, and a fourth pair of slots 92 also flank the second slot 52. In the example embodiment of FIG. 3 the first pair of slots 80 is positioned between the first slot 50 and the third pair of slots 90, and the second pair of slots 82 are positioned between the second slot 52 and the fourth pair of slots 92. Slots 90 and 92 extend along respective lines 94, 96 which do not pass through the flow axis 16. The slots 90 and 92 are furthermore asymmetric with respect to respective lines 94 and 96 as evidenced by the curved perimeter region 98 present only on one side of slots 90 and 92.

The remainder of slots 46*a* further comprises intermediate slots 100. Each intermediate slot 100 is positioned between two slots of the plurality of slots 46 (the plurality of slots including all slots in plate 44). Intermediate slots 100 extend along and are symmetric with respect to respective lines 102 which pass through the flow axis 16. Unlike the first and second slots 50 and 52, the slots 80, 82, 90, 92 and 100 which comprise the remainder of slots 46*a* each extend from the periphery 54 of the plate 44 to respective points which are in spaced relation to the nose 26. Slots 80 and 82 comprising the first and second pairs of slots extend to first points 104; slots 90 and 92 comprising the second pairs of slots extend to second points 106 and intermediate slots 100 extend to third points 108. Third points 108 are farther from the flow axis 16 than the second points 106, which are farther from the flow axis 16 than the first points 104.

Figure 4:
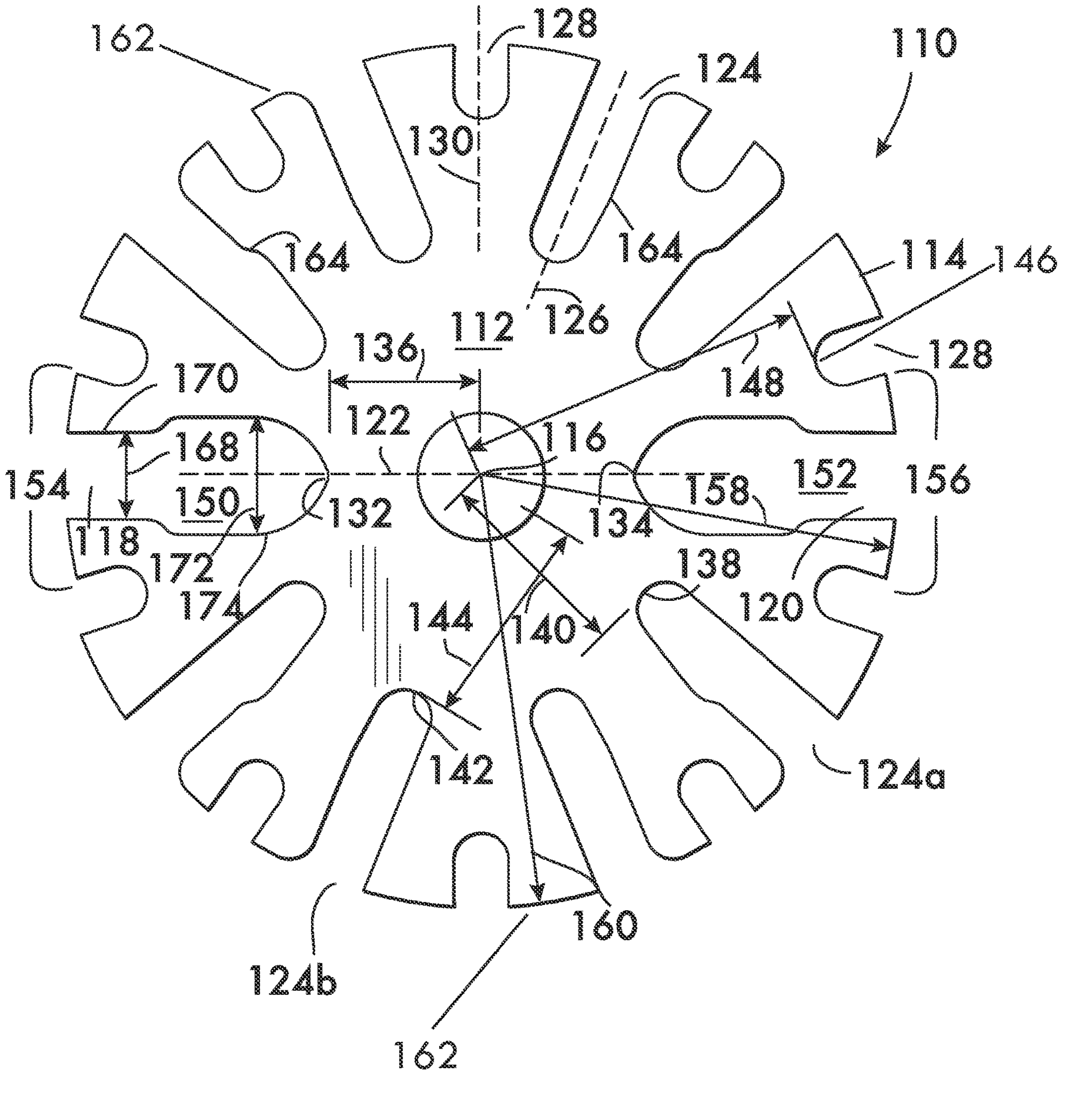
FIG. 4 is a plan view of an example deflector according to the invention for a fire suppression sprinkler.

FIG. 4 illustrates an example deflector 110 in isolation from a sprinkler body. In this example deflector 110 comprises a circular plate 112 having a periphery 114 surrounding a center 116. First and second slots 118, 120 in plate 112 extend from diametrically opposed points on the periphery along a common diameter 122 toward the center 116. A first plurality of slots 124 are positioned around plate 112. Each slot 124 of the first plurality of slots extends from the plate periphery 114 along a respective chord 126 of the circular plate 112. A second plurality of slots 128 are positioned around plate 112. Each slot 128 of the second plurality is positioned between the first and second slots 118 and 120 and extends from the periphery 112 along a respective radius 130 of the circular plate 112 toward the center 116.

As further shown in FIG. 4, the first and second slots 118 and 120 have respective ends 132, 134 at a first distance 136 from the center 116. A first half 124*a* of the first plurality of slots 124 have respective ends 138 at a second distance 140 from the center 116, and a second half 124*b* of the first plurality of slots 124 have respective ends 142 at a third distance 144 from center 116. The second plurality of slots 128 have respective ends 146 at a fourth distance 148 from the center 116. In this example embodiment the first distance 136 is less than the second distance 140, the second distance is less than the third distance 144, and the third distance is less than the fourth distance 148.

First and second slots 118 and 120 define first and second areas 150, 152. Each first and second area is greater than any area defined by any slot of the first or second plurality of slots 124, 128. Plate 112 further comprises first and second peripheral regions 154 and 156 which respectively flank the first and second slots 118 and 120. Each peripheral region 154, 156 has a radius 158 less than a radius 160 of a remainder 162 of periphery 114.

As further depicted in FIG. 4, each slot 124 of the first plurality of slots is asymmetrical with respect to the respective chord 126 along which it extends. The asymmetry is manifest by the curved perimeter regions 164 on one side of the slots 124. Slots 128 of the second plurality of slots are symmetric with respect to respective radii along which they extend. Additionally, each one of the first and second slots has a first width 168 over a first region 170 proximate to periphery 114 and a second width 172 over a second region 174 positioned between the first region 170 and the center 116. In this example embodiment the first width 168 is less than the second width 172.

Fire suppression sprinklers according to the invention are expected to meet or exceed the standards for ESFR sprinklers, including those set forth in UL 1767, and be suitable for use in warehouses having a large clearance between the ceiling and the commodity being protected.

What is claimed is:

1. A fire suppression sprinkler, said sprinkler comprising:

a body surrounding a bore, said bore defining a flow axis arranged coaxially with said bore;

first and second arms mounted on opposite sides of said body and extending therefrom in a direction along said flow axis;

a nose mounted on ends of said arms, said nose being positioned coaxially with said flow axis;

a deflector mounted on said nose, said deflector comprising:

a plate oriented transversely to said flow axis and comprising a plurality of slots defining a plurality of tines, a first and a second of said slots being radially oriented with respect to said flow axis and respectively aligned with said first and second arms, said first and second slots extending from a periphery of said plate to respective points underlying said nose, a remainder of said slots extending from said periphery to respective points in spaced relation from said nose, such that the remainder of said slots do not underlie said nose.

2. The sprinkler according to claim 1, wherein said tines positioned on opposite sides of said first and second slots have ends at a first distance from said flow axis, and said tines positioned on opposite sides of said remainder of said slots have ends at a second distance greater than said first distance.

3. The sprinkler according to claim 1, wherein said first and second slots define respective first and second areas, said first and said second areas each being greater than any area defined by any slot of said remainder of said slots.

4. The sprinkler according to claim 1, wherein said remainder of said slots further comprises a first pair of slots flanking said first slot and a second pair of slots flanking said second slot.

5. The sprinkler according to claim 4, wherein said slots comprising said first and second pairs extend along respective lines which do not intersect said flow axis.

6. The sprinkler according to claim 5, wherein each of said slots comprising said first and second pairs are asymmetrical with respect to said respective lines.

7. The sprinkler according to claim 4, wherein said remainder of said slots further comprises a third pair of slots flanking said first slot and a fourth pair of slots flanking said second slot, said first pair of slots being between said first slot and said third pair of slots, said second pair of slots being between said second slot and said fourth pair of slots.

8. The sprinkler according to claim 7, wherein each of said slots comprising said first, second, third and fourth pairs extend along respective lines which do not intersect said flow axis.

9. The sprinkler according to claim 8, wherein each of said slots comprising said first, second, third and fourth pairs are asymmetrical with respect to said respective lines.

10. The sprinkler according to claim 7, wherein said slots of said first pair extend from said periphery to first said respective points in spaced relation to said nose, and slots of said second pair extend from said periphery to second said respective points in spaced relation to said nose, said second points being further from said nose than said first points.

11. The sprinkler according to claim 10, wherein said remainder of said slots further comprises respective intermediate slots, each said intermediate slot being between two slots of said plurality of slots.

12. The sprinkler according to claim 11, wherein said intermediate slots extend from said periphery to third said respective points in spaced relation to said nose, said third said respective points being further from said nose than said second points.

13. The sprinkler according to claim 1, wherein each of said first and second slots has a first width proximate to said periphery and a second width distal to said periphery, said second width being greater than said first width.

14. The sprinkler according to claim 13, wherein said first and second arms have a first thickness proximate to said nose and a second thickness proximate to said body, said first width of said first and second slots being greater than said first thickness of said arms, said second width of said first and second slots being greater than said second thickness of said arms.

15. The sprinkler according to claim 1, further comprising:

a sealing member removably engaged with said body overlying said bore;

a heat sensitive trigger extending between said nose and said sealing member for releasing said sealing member from engagement with said body when a predetermined ambient temperature is achieved.

16. The sprinkler according to claim 15, wherein said sealing member comprises a plug and said heat sensitive trigger comprises a frangible glass bulb containing a heat sensitive liquid.

17. The sprinkler according to claim 1, having a k factor from 14 to 34.

18. The sprinkler according to claim 1, having a k factor of 16.8.

19. The sprinkler according to claim 1, wherein said deflector has a thickness, said deflector being mounted in spaced relation to said ends of said arms at a distance equal to twice the thickness of said deflector.

20. The sprinkler according to claim 1, wherein said deflector has a thickness, said deflector being mounted in spaced relation to said ends of said arms at a distance equal to three times the thickness of said deflector.

* * * * *